United States Patent
Reinking et al.

(10) Patent No.: US 7,183,348 B2
(45) Date of Patent: Feb. 27, 2007

(54) SHEAR MODIFICATION OF POLYOLEFIN-CLAY NANOCOMPOSITES

(75) Inventors: Mark K. Reinking, Mason, OH (US); Karl P. Rufener, Loveland, OH (US)

(73) Assignee: Equistar Chemicals, LP, Houston, TX (US)

( * ) Notice: Subject to any disclaimer, the term of this patent is extended or adjusted under 35 U.S.C. 154(b) by 94 days.

(21) Appl. No.: 11/034,493

(22) Filed: Jan. 13, 2005

(65) Prior Publication Data
US 2006/0155038 A1 Jul. 13, 2006

(51) Int. Cl.
*C08K 3/34* (2006.01)
*C08K 9/04* (2006.01)

(52) U.S. Cl. ............... 524/445; 524/586; 524/587; 524/582; 524/563; 524/566

(58) Field of Classification Search ......... 524/445, 524/444, 585, 584, 586, 563, 236, 443
See application file for complete search history.

(56) References Cited

U.S. PATENT DOCUMENTS

| | | | |
|---|---|---|---|
| 5,747,560 A * | 5/1998 | Christiani et al. ......... 523/209 |
| 6,171,993 B1 * | 1/2001 | Mavridis et al. ............ 502/103 |
| 6,228,903 B1 * | 5/2001 | Beall et al. ................. 523/209 |
| 6,287,634 B1 | 9/2001 | Beall et al. ................. 427/220 |
| 6,656,995 B2 * | 12/2003 | Klendworth et al. ........ 524/445 |
| 6,884,834 B2 * | 4/2005 | Reinking et al. ........... 524/445 |
| 2002/0161096 A1 * | 10/2002 | Loontjens et al. .......... 524/445 |

FOREIGN PATENT DOCUMENTS

KR 2002-29157 * 2/2003

OTHER PUBLICATIONS

Peter Reichert et al., Poly(propylene)/organoclay nanocomposite formation: Influence of compatibilizer functionality and organoclay modification, *Macromolecular Material Engineering* 275, pp. 8-17 (2000).

* cited by examiner

*Primary Examiner*—David W. Wu
*Assistant Examiner*—Rip A. Lee
(74) *Attorney, Agent, or Firm*—Shao-Hua Guo; John Calve

(57) ABSTRACT

A method for modifying polyolefin-clay nanocomposites is disclosed. The method comprises shearing a melt of solution-prepared nanocomposites at an effective shear rate. The modified nanocomposite shows significantly decreased complex melt viscosity, storage modulus, and loss modulus.

20 Claims, No Drawings

SHEAR MODIFICATION OF POLYOLEFIN-CLAY NANOCOMPOSITES

FIELD OF THE INVENTION

The invention relates to nanocomposites. More particularly, the invention relates to shear modification of polyolefin-clay nanocomposites.

BACKGROUND OF THE INVENTION

Polymer-clay nanocomposites are known. They are materials comprising a polymer matrix and exfoliated clay that is dispersed in the polymer matrix. Nanocomposites have improved mechanical properties and heat resistance compared with the base polymer. Moreover, due to the layered structures, nanocomposites have increased barrier to oxygen. This characteristic makes nanocomposites desirable candidates for the packaging materials. Thus, there is an increasing interest in developing polyolefin-clay nanocomposites since polyolefins are the most widely used packaging materials.

Clays are hydrophilic. Thus, to prepare polymer-clay composites, clays are treated with organic compounds to convert them into organoclays. Organoclays have improved compatibility with polymers, in particular, with polar polymers such as polyamide. When an organoclay is dispersed in a polymer matrix, the polymer chains insert between the adjacent layers and thereby the clay is delaminated. This process is called exfoliation.

Polyolefin-clay nanocomposites are difficult to make because organoclay and polyolefin are incompatible. To prepare polyolefin-clay nanocomposites, polymeric compatiblizing agents are required. See, e.g., www. Nanoclay-.com. See also Peter Reichert et al., Macromol. Mater. Eng., 275, pp. 8–17 (2000). Maleated polyolefins are commonly used compatiblizing agents. They are expensive. Further, the addition of maleated polymers often alters the desired properties of the nanocomposites.

Shear modification of polyolefins is also known. For instance, U.S. Pat. No. 6,171,993 teaches low-shear modification of LLDPE. The modified LLDPE shows decreased melt elasticity. However, shear modification of nanocomposite is unknown. Such modification is of significant commercial value because the modification procedure is convenient and inexpensive. Ideally, the modified nanocomposites would have significantly enhanced rheological, mechanical, and barrier properties.

SUMMARY OF THE INVENTION

The invention is a method for modifying a polyolefin-clay nanocomposite. The method comprises shearing a melt of the nanocomposite at an effective shear rate to reduce its melt viscosity. The polyolefin-clay nanocomposite is prepared by a solution process. The polyolefin is selected from the group consisting of low density polyethylene (LDPE), linear low density polyethylene (LLDPE), and polypropylene (PP), and ethylene-vinyl acetate copolymers (EVA).

DETAILED DESCRIPTION OF THE INVENTION

The invention is a method for modifying solution-prepared polyolefin-clay nanocomposites. The method comprises shearing a melt of the nanocomposite at an effective shear rate.

Methods of forming the melt may vary widely. The manner in which the melt is formed is not critical and any conventional method may be employed. Normally, the melt is formed by heating the nanocomposite to a temperature above the melting point of the nanocomposite. The upper limit of the temperature is not critical provided that the temperature is not so high as to thermally degrade the nanocomposite.

By "an effective shear rate," we mean that the melt is subjected to a shear that is effective to reduce the melt viscosity of the nanocomposite. Preferably, the shear rate is 0.01 $sec^{-1}$ or greater. The upper limit for the shear rate is not critical provided that the shear rate is not so high as to physically degrade the nanocomposite. More preferably, the shear rate is within the range of about 0.01 $sec^{-1}$ to about 100 $sec^{-1}$. Most preferably, the shear rate is within the range of about 0.01 $sec^{-1}$ to about 10 $sec^{-1}$.

Any method to shear a polymer melt can be used. The method of choice is largely dictated by convenience. Examples of shearing methods include thermal shock, pressure alteration, ultrasonics, and mechanical shearing. In one useful procedure, the polymer melt is sheared by thermal shock in which shearing is achieved by alternately raising or lowering the temperature of the melt causing thermal expansions and resulting in internal stresses which cause the shear.

In yet another useful procedure, the melt can be subjected to shear by electrical methods in which shear is achieved by high frequency electromagnetic waves impinging on the melt, and by electrical shock using waver amplitude and frequencies to cause shear.

Preferably, mechanical shearing methods are employed. On a lab scale, a mechanical shearing can be produced using a rheometer. On a commercial scale, shearing is preferably produced by extrusion in which shearing is achieved by introducing the polymer melt at one end of the extruder (single or double screw) and receiving the sheared polymer at the other end of the extruder.

The polyolefin-clay nanocomposites are made by solution process. In a preferred method, an organoclay and a polyolefin are dissolved in an organic solvent. After the solvent is removed, a nanocomposite is formed. Preferably, the nanocomposite is prepared by a solution method disclosed in co-pending application Ser. No. 10/096,640. The method comprises dispersing or dissolving an organoclay in an aromatic solvent and then adding a polyolefin into the resulting clay dispersion or solution. A polar solvent can be added to facilitate the intercalation. Suitable polar solvents include alcohols, glycols, ethers, esters, carbonates, and ketones. Many other polar compounds capable of swelling and increasing interlayer spacing of clay can be used. See, e.g., U.S. Pat. No. 6,287,634. One advantage of the solution method is that no compatiblizing agent is needed.

The key to the successful preparation of a nanocomposite is to exfoliate the clay so that the clay can be dispersed in the polymer matrix to form layered structures. The layered structures can be measured by, for example, transmission electron microscopy (TEM).

Suitable polyolefins include low density polyethylene (LDPE), linear low density polyethylene (LLDPE), and polypropylene (PP), and ethylene-vinyl acetate copolymers. LDPE and LLDPE usually have densities from 0.910 to 0.925 $g/cm^3$. See ASTM D4976-98: Standard Specification for Polyethylene Plastic Molding and Extrusion Materials. LDPE is usually made by free radical polymerization under high pressure. LLDPE is made by Ziegler or single-site catalysts. Suitable LLDPE also includes very low density polyethylene which has a density below 0.910 $g/cm^3$, typically from 0.870 to 0.910 g/cm$^3$. Preferred LLDPE is a copolymer of ethylene with $C_{3-10}$ α-olefins copolymers. More preferred LDPE and LLDPE are ethylene with $C_{4-8}$ α-olefins, such as 1-butene, 1-hexene, and 1-octene. Suitable PP includes propylene homopolymer, propylene random copolymers with ethylene or other olefin, and propylene impact copolymers. Suitable EVA includes partly or fully hydrolyzed ethylene-vinyl acetate copolymers, such as EVOH.

Suitable clays include montmorillonite, saponite, hectorite, mica, vermiculite, bentonite, nontronite, beidellite, volkonskoite, magadite, and kenyaite, the like, and mixtures thereof. Preferably, the clays are modified, for example, with quaternary ammonium compounds. The modified clays are called organoclays. Organoclays are commercially available, for example, from Southern Clay Products, Inc.

Preferably, the nanocomposite contains from about 90 wt % to about 99.9 wt % of polyolefin and from about 0.1 wt % to about 10 wt % of clay. More preferably, the nanocomposite contains from about 95 wt % to about 99 wt % of polyolefin and from about 1 wt % to about 5 wt % of clay. Polyolefin forms a matrix wherein the exfoliated clay is dispersed. In addition to polyolefin and clay, the nanocomposite comprises optional components, including fillers, plasticizers, mold release agents, antioxidants, ultraviolet light stablizers, antistatic agents, flame retardants, and the like, and mixtures thereof. These optional components are well known in the polymer industry.

One improvement of the shear-modified nanocomposite is the reduced complex viscosity ($\eta^*$), storage modulus (G'), and loss modulus (G"). Methods for measuring rheological properties are known. See, for instance, ASTM D 4440-84. The reduced viscosity makes the nanocomposite easier to process and integrate with other components such as fillers.

The following examples merely illustrate the invention. Those skilled in the art will recognize many variations that are within the spirit of the invention and scope of the claims.

EXAMPLE 1

Shear Modification Of LLDPE-Clay Nanocomposite

Preparation of LLDPE-Clay Nanocomposite

Clay (6.4 g, Claytone HY, product of Southern Clay Products, Inc.) is added to and mixed with xylene (1,500 mL) using a high shear mixer. The mixture is stirred for five minutes. Acetone (3.2 g) is then added to the solution. The resulting mixture is stirred for an additional five minutes. The mixing stops for one-half hour, then continues for an additional five minutes. The solution is then poured into a three-neck flask equipped with an overhead paddle type stirrer, a nitrogen inlet, and a nitrogen outlet which is connected to a bubbler. A linear low-density polyethylene (LLDPE) (100 g, GA501, product of Equistar Chemicals, LP) is added to the solution. The mixture is stirred for three hours. The mixing stops and the mixture stands overnight. The next day, the polymer is dissolved by heating the mixture to 110° C. for four hours and then the resulting mixture is poured onto a pan. After the solvent evaporates, the resulting LLDPE-clay nanocomposite is collected, cut into strips, and dried under vacuum at 80° C.

Shear Modification

Shear-modification is performed in an ARES rheometer. The nanocomposite sample is melted at 150° C. The melt is subject to shearing at a shear rate of 0.02 sec$^{-1}$ for 50–70 minutes.

Rheological Test

Rheological properties are determined for the nanocomposite samples before and after shear modification using a standard test procedure, ASTM D 4440-84. The frequencies range from 0.01 to 100 rad/sec. The rheometer is operated at 190° C. in a nitrogen environment to minimize oxidation or degradation of the sample. The gap in the parallel plate geometry is 1.2–1.4 mm and the strain amplitude is 10%. The results are listed in Table 1, which indicates that the shear modification significantly decreases the complex viscosity ($\eta^*$), storage modulus (G'), and loss modulus (G").

TABLE 1

| Shear rate sec$^{-1}$ | Before Shear Modification | | | After Shear Modification | | |
|---|---|---|---|---|---|---|
| | G' dyn/cm$^2$ | G" dyn/cm$^2$ | $\eta^*$ Poise | G' dyn/cm$^2$ | G" dyn/cm$^2$ | $\eta^*$ Poise |
| 0.1 | $3.4 \times 10^4$ | $4.6 \times 10^4$ | $5.7 \times 10^5$ | $1.4 \times 10^4$ | $3.3 \times 10^4$ | $3.6 \times 10^5$ |
| 1 | $1.2 \times 10^5$ | $2.1 \times 10^5$ | $2.4 \times 10^5$ | $8.0 \times 10^4$ | $1.8 \times 10^5$ | $1.9 \times 10^5$ |
| 10 | $6.2 \times 10^5$ | $8.6 \times 10^5$ | $1.1 \times 10^5$ | $5.2 \times 10^5$ | $7.9 \times 10^5$ | $9.5 \times 10^4$ |
| 100 | $2.6 \times 10^6$ | $2.7 \times 10^6$ | $3.7 \times 10^4$ | $2.4 \times 10^6$ | $2.5 \times 10^6$ | $3.4 \times 10^4$ |

EXAMPLE 2

Shear Modification of LDPE-Clay Nanocomposite

The procedure of Example 1 is repeated but LDPE (NA960, product of Equistar Chemicals, LP) are used. The nanocomposite samples are tested for rheological properties at 150° C. before and after shear modification. The results are listed in Table 2, which indicates that the shear modification significantly decreases $\eta^*$, G', and G".

TABLE 2

| Shear rate sec$^{-1}$ | Before Shear Modification | | | After Shear Modification | | |
|---|---|---|---|---|---|---|
| | G' dyn/cm$^2$ | G" dyn/cm$^2$ | $\eta^*$ Poise | G' dyn/cm$^2$ | G" dyn/cm$^2$ | $\eta^*$ Poise |
| 0.1 | $2.8 \times 10^4$ | $3.7 \times 10^4$ | $4.7 \times 10^5$ | $2.2 \times 10^4$ | $3.2 \times 10^4$ | $3.9 \times 10^5$ |
| 1 | $1.1 \times 10^5$ | $1.1 \times 10^5$ | $1.6 \times 10^5$ | $9.8 \times 10^4$ | $9.9 \times 10^4$ | $1.4 \times 10^5$ |
| 10 | $3.5 \times 10^5$ | $2.6 \times 10^5$ | $4.3 \times 10^4$ | $3.1 \times 10^5$ | $2.4 \times 10^5$ | $3.9 \times 10^4$ |
| 100 | $8.8 \times 10^5$ | $5.6 \times 10^5$ | $1.0 \times 10^4$ | $7.9 \times 10^5$ | $5.2 \times 10^5$ | $9.5 \times 10^3$ |

EXAMPLE 3

Shear Modification of PP-Clay Nanocomposite

Example 1 is repeated but PP PP51S07A (product of Equistar Chemicals, LP) is used. The nanocomposite samples are tested for rheological properties at 210° C.

before and after shear modification. The results are listed in Table 3, which indicates that the shear modification significantly decreases η*, G', and G".

TABLE 3

| Shear rate sec$^{-1}$ | Before Shear Modification | | | After Shear Modification | | |
|---|---|---|---|---|---|---|
| | G' dyn/cm$^2$ | G" dyn/cm$^2$ | η* Poise | G' dyn/cm$^2$ | G" dyn/cm$^2$ | η* Poise |
| 0.1 | 2.3 × 10$^4$ | 3.6 × 10$^4$ | 4.3 × 10$^5$ | 8.9 × 10$^3$ | 2.1 × 10$^4$ | 2.3 × 10$^5$ |
| 1 | 1.1 × 10$^5$ | 1.3 × 10$^5$ | 1.7 × 10$^5$ | 6.2 × 10$^4$ | 9.2 × 10$^4$ | 1.1 × 10$^5$ |
| 10 | 4.2 × 10$^5$ | 3.5 × 10$^5$ | 5.4 × 10$^4$ | 2.9 × 10$^5$ | 2.6 × 10$^5$ | 3.8 × 10$^4$ |
| 100 | 1.1 × 10$^6$ | 5.9 × 10$^5$ | 1.3 × 10$^4$ | 8.0 × 10$^5$ | 4.5 × 10$^5$ | 9.2 × 10$^3$ |

EXAMPLE 4

Shear Modification of EVA-Clay Nanocomposite

Claytone HY (52.6 g) is dispersed in toluene (2,000 mL) using an overhead paddle type stirrer. To the clay dispersion is added 300 g of ethylene vinyl acetate (EVA) (EVA UE624, a product of Equistar Chemicals, LP). The mixture is heated to 98° C. and then poured onto a pan to dry. TEM shows that the EVA is intercalated into the clay. The nanocomposite samples are tested for rheological properties at 150° C. before and after shear modification. The results are listed in Table 4, which indicates that the shear modification significantly decreases η*, G', and G".

TABLE 4

| Shear rate sec$^{-1}$ | Before Shear Modification | | | After Shear Modification | | |
|---|---|---|---|---|---|---|
| | G' dyn/cm$^2$ | G" dyn/cm$^2$ | η* Poise | G' dyn/cm$^2$ | G" dyn/cm$^2$ | η* Poise |
| 0.1 | 1.8 × 10$^5$ | 8.9 × 10$^4$ | 2.0 × 10$^6$ | 5.6 × 10$^4$ | 3.5 × 10$^4$ | 6.6 × 10$^5$ |
| 1 | 2.8 × 10$^5$ | 1.4 × 10$^5$ | 3.2 × 10$^5$ | 1.0 × 10$^5$ | 6.9 × 10$^4$ | 1.2 × 10$^5$ |
| 10 | 6.0 × 10$^5$ | 3.0 × 10$^5$ | 6.7 × 10$^4$ | 2.3 × 10$^5$ | 1.3 × 10$^5$ | 2.6 × 10$^4$ |
| 100 | 1.4 × 10$^6$ | 7.0 × 10$^7$ | 1.5 × 10$^4$ | 5.0 × 10$^5$ | 2.6 × 10$^5$ | 5.6 × 10$^3$ |

We claim:

1. A method for reducing the melt viscosity of a solution-prepared polyolefin-clay nanocomposite, said method comprising dispersing a clay in a solvent, mixing a polyolefin with the clay dispersion, evaporating the solvent to obtain a polyolefin-nanocomposite and shearing a melt of the polyolefin-clay nanocomposite at a shear rate effective to reduce its melt viscosity, wherein the polyolefin is selected from the group consisting of low density polyethylene (LDPE), linear low density polyethylene (LLDPE), polypropylene (PP), ethylene-vinyl acetate copolymers (EVA), and mixtures thereof.

2. The method of claim 1 wherein the polyolefin is selected from the group consisting of LDPE, LLDPE and mixtures thereof.

3. The method of claim 1 wherein the polyolefin is a PP.

4. The method of claim 1 wherein the polyolefin is an EVA.

5. The method of claim 1 wherein the solvent is a mixture of an aromatic solvent and a polar solvent selected from the group consisting of ethers, esters, glycols, alcohols, carbonates, ketones, and mixtures thereof.

6. The method of claim 5 wherein the polar solvent is a ketone.

7. The method of claim 5 wherein the polar solvent is acetone.

8. The method of claim 5 wherein the aromatic solvent is xylene.

9. The method of claim 5 wherein the solvent mixture has a weight ratio of aromatic solvent/polar solvent greater than 1.

10. The method of claim 1 wherein the shear rate is about 0.01 sec$^{-1}$ or greater.

11. The method of claim 1 wherein the shear rate is within the range of about 0.01 sec$^{-1}$ to about 100 sec$^{-1}$.

12. The method of claim 1 wherein the shear rate is within the range of about 0.01 sec$^{-1}$ to about 10 sec$^{-1}$.

13. The method of claim 1 wherein the shear rate is within the range of about 0.1 sec$^{-1}$ to about 10 sec$^{-1}$.

14. The method of claim 1 wherein the shear rate is within the range of about 0.1 sec$^{-1}$ to about 1 sec$^{-1}$.

15. The method of claim 1 wherein the shearing of the melt is performed at a temperature of about 135 ° C. to about 165° C.

16. The method of claim 1 wherein the nanocomposite contains from about 90 wt % to about 99.9 wt % of polyolefin and from about 0.1 wt % to about 10 wt % of clay.

17. The method of claim 1 wherein the nanocomposite contains from about 95 wt % to about 99 wt % of polyolefin and from about 1 wt % to about 10 wt % of clay.

18. The method of claim 1 wherein the mixing is performed in the absence of a polymeric compatibilizing agent.

19. The method of claim 1 wherein the clay is an alkyl amine- or quaternary ammonium-modified clay.

20. A modified nanocomposite made by the method of claim 1.

* * * * *